3,387,939
STANNATE STABILIZER COMPOSITIONS CONTAINING AN ALKYLIDENE DIPHOSPHONIC ACID, THEIR PREPARATION AND HYDROGEN PEROXIDE SOLUTIONS STABILIZED THEREWITH
Victor J. Reilly, Memphis, Tenn., and Neil J. Stalter, Wilmington, Del., assignors to E. I. du Pont de Nemours and Company, Wilmington, Del., a corporation of Delaware
No Drawing. Filed July 6, 1966, Ser. No. 563,023
11 Claims. (Cl. 23—207.5)

ABSTRACT OF THE DISCLOSURE

Stannate stabilizer compositions containing an alkylidene diphosphonic acid, a method for their preparation and hydrogen peroxide solutions stabilized therewith. The stabilized hydrogen peroxide solutions are highly stable against decomposition and resistant towards precipitation of the stannate stabilizer by polyvalent cations such as $Ca^{++}$, $Mg^{++}$, and $Al^{+++}$.

Background of the invention

It has long been known that small amounts of impurities, especially heavy metal ions, catalyze the decomposition of hydrogen peroxide. Many types of stabilizers have been proposed as inhibitors of such catalytic decomposition and have been added for that purpose to hydrogen peroxide solutions intended to be stored or shipped. Stannate type stabilizers have been recognized as being very effective. Thus, Liebknecht et al. U.S. Patent 1,213,921 proposed the use of precipitated stannic acid, but the soluble stannates such as the alkali metal stannates, particularly sodium stannate, as proposed in Reichert U.S. Patent 1,958,204, are more effective and have been widely used to stabilize acidic hydrogen peroxide solutions of commerce.

One major problem attending the use of stannate stabilizers is the tendency of stannate in hydrogen peroxide solutions to precipitate, particularly in the presence of polyvalent cations such as $Ca^{++}$, $Mg^{++}$ and $Al^{+++}$. Aluminum cations are introduced into the hydrogen peroxide when aluminum containers and vessels, commonly used to store and handle hydrogen peroxide solutions, become corroded by such solutions. Calcium and/or magnesium cations are introduced into hydrogen peroxide solutions when such solutions are diluted with hard water. Much stannate stabilized hydrogen peroxide is now produced and sold as concentrated aqueous solutions, e.g., solutions containing 70% or more $H_2O_2$ by weight. For most users, however, it is more convenient and safer to handle and store the peroxide in the form of more dilute solutions, e.g., 35% or 50% solutions. This situation has led to a substantial demand for concentrated peroxide solutions which can be readily diluted with water available at the user's plant to obtain directly stable and precipitate-free solutions of such dilution, e.g., 35%, as is preferred for handling and storing at the plant. However, the most readily available water for effecting such dilution is often hard water containing substantial amounts of dissolved calcium and/or magnesium compounds which cause stannate precipitation in the diluted solution. Since precipitated stannate is much less effective as a stabilizer than is soluble stannate, avoidance of such precipitation is obviously highly desirable. The use of distilled water or deionized water as the diluent would, of course, avoid the introduction of undesired calcium and magnesium compounds, but distilled and deionized waters are relatively costly and are not readily available at many users' plants.

In stabilizing hydrogen peroxide solutions, the dry soluble stannate salt is seldom added directly to the solution to be stabilized; it is much more convenient and practical to make up a stock stannate stabilizer solution or composition which is then added as required to the peroxide solution to be stabilized. Furthermore, pre-formed stabilizer solutions are generally more effective than the dry stannates, but their effectiveness depends to a great extent upon how they are prepared.

Reichert U.S. Patent 1,958,204 suggests increasing the effectiveness of a solution of sodium stannate by allowing it to age several days at ordinary temperature or by heating it at 75 to 100° C. for an hour or so before use. Roth U.S. Patent 2,872,293 proposes preparing a stabilizer solution by dissolving sodium stannate in unstabilized hydrogen peroxide solution of at least 20% concentration having a pH of about 5, which stabilizer solution is then added as required to the peroxide solution to be stabilized. Baker U.S. Patent 2,904,517 suggests forming a water solution of sodium stannate, sodium pyrophosphate and ammonium nitrate and then adjusting the pH of the solution to an alkaline pH less than 9 before using it to stabilize hydrogen peroxide. Meeker U.S. Patent 3,114,606 proposes a specific procedure for making a stock stabilizer solution which has a pH of 1–4 and contains polymerized stannate and a tin complexnig agent such as a polycarboxyamine compound or a phosphate.

While the stabilizer compositions obtained by all the above methods are fairly effective stabilizers, they are not as resistant as desired to stannate precipitation caused by the presence of substantial concentrations of polyvalent cations and their use does not adequately solve the serious stannate precipitation problem encountered when stannate stabilized concentrated hydrogen peroxide solutions are diluted with hard water.

Description of the invention

It has now been found that stannate stabilized hydrogen peroxide solutions which do not precipitate stannate even in the presence of substantial concentrations of polyvalent cations, which concentrations are substantially greater than those normally encountered when diluting the stabilized solutions with hard water, can be readily obtained by adding to the peroxide solution to be stabilized a soluble stannate and an alkylidene diphosphonic acid to provide concentrations thereof which effectively stabilize the peroxide solution against decomposition and against stannate precipitation by polyvalent cations. Preferably, the peroxide solution is stabilized by the addition thereto of a stabilizer composition which is an aqueous solution containing both a soluble stannate and an alkylidene diphosphonic acid. Most preferably, the stabilizer composition is one which has been prepared as described below. Such diphosphonic acids apparently form soluble tin complexes which are highly resistant to precipitation by polyvalent cations and also highly resistant to attack by hydrogen peroxide. At any rate, concentrated hydrogen peroxide solutions stabilized in accordance with the invention can be readily diluted with water containing quite high concentrations of polyvalent cations such as $Ca^{++}$, to yield more dilute solutions which are stable both against peroxide decomposition and stannate precipitation.

The stannate stabilizer compositions of the invention are preferably prepared by dissolving a soluble stannate in water to give a solution containing from about 0.5 to 40%, preferably 2 to 25%, dissolved stannate, calculated as $Na_2SnO_3 \cdot 3H_2O$, and adding thereto an alkylidene diphosphonic acid of the formula

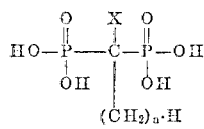

wherein X is hydrogen or the hydroxyl radical and $n$ is a whole number from 0 to 5, in an amount sufficient to adjust the pH of the solution to a value in the range of 8 to 11.0, the most preferred pH being in the range of 9 to 10.5. Advantageously, the resulting solution is allowed to age several days at ordinary temperature, or for a shorter period at an elevated temperature, e.g., 1 to 5 hours at 75 to 100° C., prior to adding it to the hydrogen peroxide solution that is to be stabilized.

The stannate stabilizer compositions of the invention prepared as described above comprise aqueous solutions containing a soluble stannate at a concentration, calculated as $Na_2SnO_3 \cdot 3H_2O$, of from about 0.5 to about 40%, preferably 2 to 25%, and an alkylidene diphosphonic acid of the above formula at a concentration of about 0.2 to 25%, preferably 0.5 to 15%.

The present stabilizer compositions can be effectively employed to stabilize aqueous hydrogen peroxide solutions of any desired concentration, e.g., solutions containing from as low as about 3% to as high as 90% or more $H_2O_2$ by weight. However, since the stabilizer compositions are outstandingly suited and useful for stabilizing relatively concentrated solutions that may subsequently be diluted by the addition thereto of a substantial amount of hard water so as to give solutions of such dilutions as may be preferred for handling and storing at users' plants, the stabilizer compositions will most generally be used to stabilize such relatively concentrated solutions. More particularly, they most generally will be used to stabilize hydrogen peroxide solutions containing about 50% or more, and particularly about 70%, $H_2O_2$ by weight.

The stabilizer composition may be added in any desired amount to the hydrogen peroxide solution to be stabilized. The amount obviously should be sufficient to provide stannate at a concentration that will inhibit significantly decomposition of the peroxide. A stannate concentration, calculated as $Na_2SnO_3 \cdot 3H_2O$, in the hydrogen peroxide solution as low as 2 mg. per liter will usually exert a worthwhile stabilizing effect against peroxide decompositions, but concentrations of from 5 to 2000 mg. per liter or higher will most generally be used. Where the peroxide solution to be stabilized is expected to be diluted after addition of the stabilizer, e.g., upon delivery at a user's plant, the amount of stabilizer used should take into consideration the extent of the expected dilution. Stannate stabilizer concentrations of from about 50 to 500 mg. per liter for solutions containing 50% or more, e.g., 70%, $H_2O_2$ will generally be adequate to provide highly effective stabilization against peroxide decomposition after dilution of the initially stabilized solution as much as 30 fold.

The alkylidene diphosphonic acid used should be sufficient to provide a concentration thereof in the stannate-stabilized peroxide solution that will inhibit significantly stannate precipitation in the presence of polyvalent cations. Such amount will depend somewhat upon the amount of stannate present and upon the amounts of polyvalent cations likely to be introduced subsequently. Concentrations as low as about 20 mg. per liter are beneficial but concentrations of from 50 to 5000 mg. per liter will most generally be used. As with the stannate, the amount of the diphosphonic acid to be used should take into account the extent of the expected dilution of the peroxide. When using stannate at the preferred concentrations indicated above, diphosphonic acid concentrations of from 100 to 1000 mg. per liter for solutions containing about 50% or more, e.g., 70%, $H_2O_2$, will generally be adequate to provide effective stabilization against both peroxide decomposition and stannate precipitation after dilution of the initially stabilized solution as much as 10 fold with common hard water.

A substantial part of the diphosphonic acid used is preferably added to the peroxide solution as part of the stannate stabilizer composition used to supply the stannate requirement. Most preferably, a substantial part of the diphosphonic acid used will also be employed to adjust the pH of the stannate stabilized peroxide solution to near its equivalence point, for reasons indicated below, to obtain a stabilized concentrated e.g., 70%, $H_2O_2$ solution containing from 50 to 500 mg. per liter of sodium stannate and 100 to 1000 mg. per liter of the diphosphonic acid per liter.

The hydrogen peroxide solution which is stabilized in accordance with the invention should be acidic and generally should have a pH not higher than about 6, e.g., 0 to 6. The pH of the hydrogen peroxide solution will vary depending upon its $H_2O_2$ content and, as disclosed in Elston U.S. patent 2,497,814, the stability of the hydrogen peroxide solution is generally greatest at about that pH which represents the so-called equivalence point of the peroxide solution. Thus, the equivalence points and the pH's of 35%, 50% and 70% $H_2O_2$ solutions at which they are most stable are, respectively, the apparent pH values of about 3.7, 2.7 and 1.5, as measured by a glass electrode. It is, therefore, most preferred to adjust the pH of peroxide solutions stabilized in accordance with the invention, i.e., with the combination of the soluble stannate and an alkylidene diphosphonic acid, to a pH which is not more than about 1.5 pH units either above or below the pH representing the equivalence point of the peroxide solution. pH adjustment, when desired, can be effected by the addition of any suitable acid such as nitric acid, sulfuric acid, lactic acid, citric acid and the like, or by the addition of any suitable alkali such as ammonium hydroxide, sodium hydroxide, potassium hydroxide and the like. Since stabilization will usually be effected by addition to the peroxide solution of a relatively alkaline stannate or stabilizer composition, adjustment of the pH of the resulting peroxide solution to near its equivalence point will usually require the addition of an acid and, for this purpose, the use of an alkylidene diphosphonic acid of the formula given above is preferred.

Inorganic phosphates are generally regarded as peroxide stabilizers useful alone or together with other stabilizers. Thus, the use of a phosphate such as sodium pyrophosphate in combination with sodium stannate has been considered as beneficial and has been widely used. Strangely enough, the presence of an inorganic phosphate such as sodium pyrophosphate in the stannate-alkylidene diphosphonic acid stabilizer compositions of the invention decreases significantly the stability of peroxide solutions stabilized therewith against precipitation of stannate by polyvalent cations. Accordingly, the preferred stabilizer compositions of the invention are free or relatively free of inorganic phosphates.

The soluble stannate stabilizer used in practicing the invention can be ammonium stannate or an alkali metal stannate such as sodium or potassium stannate. Sodium stannate is preferred because of its ready availability.

The alkylidene diphosphonic acids usable in accordance with the invention are those of the formula

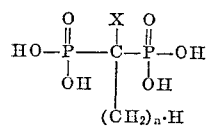

wherein X is hydrogen or the hydroxyl group and $n$ is a whole number of from 0 to 5. Examples are methylene and ethylidene diphosphonic acids and the 1-hydroxyethylidene, 1-hydroxypropylidene and 1-hydroxybutylidene diphosphonic acids. Of the diphosphonic acids of the above general formula, those in which X is the hydroxyl group and $n$ is 1 to 5, i.e., the 1-hydroxyalkylidene diphosphonic acids containing from 2 to 6 carbon atoms are preferred. These preferred diphosphonic acids are known as stabilizers for hydrogen peroxide solutions; they are disclosed as such in Blaser et al. U.S. Patent 3,122,417.

When using the above diphosphonic acids in combination with a soluble stannate in accordance with the invention, the prime function of the diphosphonic acid is to complex, sequester or peptize the stannate and keep the latter in solution even in the presence of substantial concentrations of polyvalent cations which generally precipitate stannate. These diphosphonic acids are admirably suited for this purpose since they are excellent stannate solubilizers and they are highly stable, i.e., they are not oxidatively degraded by concentrated peroxide solutions, during long periods of storage, even at elevated temperatures. In this respect, they are distinctly superior to the well-known polycarboxyamine type metal sequestering agents, such as ethylenediaminetetraacetic acid and the like nitrogenous sequestering agents which are attacked and degraded by concentrated peroxide solutions.

The beneficial stannate complexing action of the above diphosphonic acids can be realized when all or part of the diphosphonic acid is added to the peroxide solution separately from the stannate, particularly when no phosphate is used. However, if all is added separately from the stannate, the effectiveness of the stannate to stabilize the peroxide against decomposition is impaired somewhat. Accordingly, it is preferred that a substantial part of the diphosphonic acid be employed to adjust the pH of the stannate solution to a value in the range pH 8 to 11.0, preferably 9 to 10.5, when forming the stock stabilizer composition comprising a water soluble stannate-diphosphonic acid complex. Addition of such stabilizer composition to the peroxide solution to be stabilized would thus supply at least a substantial part of the diphosphonic acid requirement. If a further amount of the diphosphonic acid is desired or required to assure the desired stability against stannate precipitation, such further amount can be supplied by use of the diphosphonic acid to adjust the pH of the stabilized peroxide to near its equivalence point, as is preferred, or further amounts of the diphosphonic acid can be added to the peroxide in the form of its ammonium or alkali metal salt or of a solution of such salt.

The following examples are intended to illustrate, but not to limit, the invention. In all the examples and elsewhere herein, all concentrations expressed as percentages or parts per million (p.p.m.) are by weight, and all pH values are apparent pH values as directly measured using a glass electrode.

EXAMPLE 1

A 3.5% solution of sodium stannate, $Na_2SnO_3 \cdot 3H_2O$, in distilled water was prepared. Its pH, which was 11.2 as originally prepared, was adjusted to pH 10 by the addition under agitation of 1-hydroxyethylidene diphosphonic acid to provide a stock stabilizer composition containing 3.5% of the stannate and 1.2% of the diphosphonic acid. The stabilizer composition was then added to a previously unstabilized 70% $H_2O_2$ solution in an amount to provide 300 mg. of sodium stannate ($Na_2SnO_3 \cdot 3H_2O$) per liter, following which the pH of the peroxide solution was adjusted to about 1 by the addition of the hydroxyethylidene diphosphonic acid and 500 mg. $NH_4NO_3/l$. was added. The ammonium nitrate, which is not essential, was added simply because it or sodium nitrate is usually added to peroxide solutions to be stored in aluminum containers for the purpose of inhibiting corrosion of the aluminum. The resulting peroxide solution contained about 300 mg. of sodium stannate and about 200 mg. of the diphosphonic acid per liter.

Part of the 70% $H_2O_2$ solution stabilized as described above was diluted with distilled water to a solution of 35% $H_2O_2$ concentration which was then contaminated with such amounts of a ferric ammonium sulfate solution, a cupric sulfate solution, a manganous sulfate solution and a potassium chromate ($K_2CrO_4$) solution, as to provide in the peroxide solution concentrations of 1 mg./l. $Fe^{+++}$, 0.2 mg./l. $Cu^{++}$, 0.1 mg./l. $Mn^{++}$ and 0.05 mg./l. Cr. The peroxide stability of the contaminated 35% solution was then tested at 100° C. The $H_2O_2$ lost/hr. at that temperature was found to be only 0.5%, which is a very low decomposition loss considering the high contamination with active heavy metal decomposition catalysts. Another part of the stabilized 70% peroxide solution was tested for its stability against stannate precipitation by calcium ions. In this test, the 70% solution was diluted to 35% by the addition of the required amount of water containing 200 p.p.m. $Ca^{++}$ added as calcium chloride. No precipitate formed in the diluted solution when stored at 50° C. for one month.

Another portion of the unstabilized 70% $H_2O_2$ solution was stabilized by the addition thereto of sufficient of a stannate stabilizer composition to provide a stannate concentration (calculated as $Na_2SnO_3 \cdot 3H_2O$) of 300 mg. per liter of the peroxide solution. The pH of the peroxide solution was then adjusted to pH 1 by the addition of phosphoric acid and 500 mg. $NH_4NO_3$ per liter was added. A part of the stabilized solution, after being diluted to 35% concentration with distilled water and then contaminated as described above, showed a peroxide decomposition loss of 0.5% per hour at 100° C. Another part, after being diluted to 35% concentration with water containing $Ca^{++}$, developed a precipitate within one day at ambient temperature when the diluting water contained as little as 50 p.p.m. $Ca^{++}$. The stannate stabilizer composition used initially to stabilize the 70% $H_2O_2$ solution was prepared by forming an aqueous solution containing 3.5% sodium stannate and 3.5% sodium pyrophosphate ($Na_4P_2O_7 \cdot 10H_2O$), adjusting the pH of the solution to pH 7 by means of nitric acid, then digesting the resulting solution for 3 hours at 85–95° C. As indicated by the above test results, this stabilizer composition combining stannate and pyrophosphate gives good stability against peroxide decomposition but poor stability against stannate precipitation.

Still another portion of the unstabilized 70% $H_2O_2$ solution was stabilized by adding thereto sufficient of a stannate stabilizer composition to provide a stannate concentration of 300 mg. of stannate ($Na_2SnO_3 \cdot 3H_2O$) per liter of the peroxide solution. The pH of the latter was adjusted to pH 0.5 by means of amino tri(ethylidene phosphonic acid) and 500 mg. per liter of sodium nitrate was added. After being diluted to 35% strength and contaminated as described above, this solution showed a peroxide decomposition loss of 0.3%/hr. at 100° C. After dilution to 35% strength with water containing 200 p.p.m. $Ca^{++}$ as described above, a precipitate formed therein within 2 hours at 50° C., and also within 7 days at 50° C. when the dilution water contained only 100 p.p.m. $Ca^{++}$. The stannate stabilizer composition used was prepared by adding amino tri(ethylene phosphonic acid), about 2.5 g., to 100 ml. of a 3.4% sodium stannate solution to adjust the pH thereof to pH 7, then digesting the resulting solution for 3 hours at 85–95° C. (The amino tri(ethylidene phosphonic acid) used is disclosed in Irani U.S. Patent 3,234,140 as a stabilizer for hydrogen peroxide solutions.) As indicated by the above test results, this stabilizer composition combining stannate and amino tri(ethylene phosphonic acid) gives good stability against peroxide decomposition but poor stability against stannate precipitation.

EXAMPLE 2

Several stabilizer compositions were prepared as generally described in Example 1 except that the pH of the original stannate solutions were adjusted to varying levels using various amounts of 1-hydroxyethylidene diphosphonic acid. The compositions were then used to stabilize 70% H₂O₂ solutions, which solutions were then adjusted to pH 1 using the above diphosphonic acid, and the effectiveness of the compositions as stabilizers against peroxide decomposition and against stannate precipitation were tested, all as described in Example 1. In a control experiment, an untreated 3.5% water solution of sodium stannate (a) was similarly used. The results were:

| Stabilizer Composition | | Diphosphonic Acid to adjust H₂O₂ sol'n. to pH 1, mg./l. | Contaminated 35% H₂O₂, H₂O₂ lost/hr., at 100° C., % |
|---|---|---|---|
| pH | Diphosphonic Acid, percent | | |
| (a) 11.2 | 0 | 270 | 2 |
| (b) 10.9 | 0.27 | 250 | 0.87 |
| (c) 10.8 | 0.5 | 220 | 0.73 |
| (d) 10.7 | 0.8 | 200 | 0.67 |
| (e) 10.0 | 1.2 | 170 | 0.5 |
| (f) 9.0 | 1.7 | 130 | 0.57 |
| (g) 8.5 | 1.8 | 120 | 0.87 |

All of the above stabilizer compositions, i.e., (a) to (g), were effective stabilizers against stannate precipitation when tested as described in Example 1.

The above results demonstrate that the pH to which the stannate solution is adjusted by means of the diphosphonic acid when preparing the stabilizer composition has a pronounced effect upon the effectiveness of the composition as a stabilizer against peroxide decomposition but not against stannate precipitation. They also show that addition of the diphosphonic acid to the peroxide solution separately from the stannate solution as in (a) effectively stabilizes against stannate precipitation when diluted with water containing $Ca^{++}$.

EXAMPLE 3

Several stabilizer compositions were prepared as generally described in Example 1, except that the pH values of the original stannate solutions were adjusted to the values indicated in the table below by the addition of 1-hydroxyethylidene diphosphonic acid, and the resulting solutions were digested at 85–95° C. for 2 hours before they were used to stabilize 70% H₂O₂ solutions as described in Example 1. The stabilized peroxide solutions were then tested for their stabilities against peroxide decomposition and stannate precipitation, also as described in Example 1, with the following results:

| pH | Stabilizer Composition Diphosphonic Acid, percent | Contaminated 35% H₂O₂, H₂O₂ lost/hr. at 100° C., percent |
|---|---|---|
| 10 | 1.2 | 0.33 |
| 9 | 1.7 | 0.4 |
| 8 | 2.0 | 0.75 |
| 7 | 2.5 | 1.1 |

All of the stabilized 70% peroxide solutions remained clear when diluted to 35% strength with water containing 200 p.p.m. $Ca^{+++}$.

The above results, compared with those of Example 2, show that digestion of the present stabilizer compositions for a short time at elevated temperature increases somewhat their effectiveness in stabilizing the peroxide against decomposition. A similar improvement can be realized by permitting the stabilizer compositions to age at ordinary temperature for a longer time, e.g., 2 or more days.

EXAMPLE 4

A stabilizer composition was prepared by dissolving 3.4 g. each of Na₄P₂O₇·10H₂O and Na₂SnO₃·3H₂O in 100 ml. of water, adjusting the pH of the resulting solution to 9.5 by the addition of 2 g. of 1-hydroxyethylidene diphosphonic acid, then digesting the solution at 85–95° C. for 3 hours. Sufficient of this composition was added to an unstabilized 70% H₂O₂ solution to provide 300 mg. sodium stannate per liter and the pH of the peroxide solution was adjusted to 1 by the addition of 280 mg. per liter of the diphosphonic acid. When tested for stability against peroxide decomposition as described in Example 1, the contaminated 35% solution showed a peroxide loss per hour at 100° C. of 0.42%. However, when the stabilized 70% solution was diluted to 35% strength with water containing 200 p.p.m. $Ca^{+++}$, the 35% solution gave a precipitate upon being stored for 1 month at 50° C., but did not develop any precipitate when stored for the same time at ambient temperature. These results, compared with those of Example 1, show that the presence of pyrophosphate decreases the effectiveness of the diphosphonic acid in preventing stannate precipitation.

The embodiments of the invention in which an exclusive property or privilege is claimed are as follows:

1. The method of preparing a hydrogen peroxide stabilizer composition comprising providing an aqueous solution of a soluble stannate from the group consisting of ammonium and the alkali metal stannates, said solution containing 0.5 to 40% by weight of said stannate, calculated as Na₂SnO₃·3H₂O, and adding to said solution an alkylidene diphosphonic acid of the formula

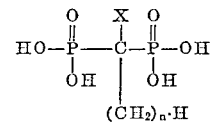

wherein X is hydrogen or the hydroxyl radical and $n$ is a whole number from 0 to 5, in an amount sufficient to adjust the pH of said solution to a pH in the range 8 to 11.0.

2. The method of claim 1 wherein the soluble stannate is sodium stannate and the alkylidene diphosphonic acid is 1-hydroxyethylidene diphosphonic acid.

3. The method of claim 2 wherein the pH of the stannate solution is adjusted to a pH in the range 9 to 10.5.

4. A stannate hydrogen peroxide stabilizer composition comprising an aqueous solution containing a soluble stannate of the groups consisting of ammonium and the alkali metal stannates at a concentration, calculated as Na₂Sn₃·3H₂O, of about 0.5 to 40% by weight, and an alkylidene diphosphonic acid at a concentration of about 0.2 to 25% by weight, said solution having a pH of 8 to 11.0 and said alkylidene diphosphonic acid being of the formula

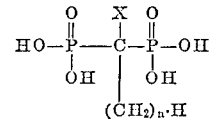

wherein X is hydrogen or the hydroxyl radical and $n$ is a whole number from 0 to 5.

5. The stabilizer composition of claim 4 wherein the stannate is sodium stannate and the alkylidene diphosphonic acid is 1-hydroxyethylidene diphosphonic acid.

6. The stabilizer composition of claim 5 wherein the sodium stannate concentration is 2 to 25%, the 1-hydroxyethylidene diphosphonic acid concentration is 0.5 to 15% and the pH of the solution is 9 to 10.5.

7. A composition comprising an acidic aqueous hydrogen peroxide solution containing a stannate from the group consisting of ammonium and the alkali metal stannates at a concentration sufficient to inhibit peroxide decomposition and an alkylidene diphosphonic acid at a concentration sufficient to inhibit precipitation of said stannate in the presence of polyvalent cations, said alkylidene diphosphonic acid being of the formula

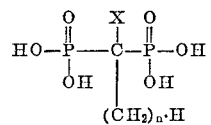

wherein X is hydrogen or the hydroxyl radical and $n$ is a whole number from 0 to 5.

8. A composition according to claim 7 wherein the stannate is present at a concentration, calculated as Na₂SnO₃·3H₂O, of 2 to 2000 mg. per liter, the alkylidene diphosphonic acid is a 1-hydroxyalkylidene diphosphonic acid and is present at a concentration of 20 to 5000 mg. per liter, and the hydrogen peroxide solution contains at least 50% $H_2O_2$ by weight and has a pH of from 0 to 6.

9. A composition according to claim 8 wherein the stannate is sodium stannate and is present at a concentration of 50 to 500 mg. per liter, and the diphosphonic acid is 1-hydroxyethylidene diphosphonic acid and is present at a concentration of 100 to 1000 mg. per liter.

10. A composition according to claim 7 wherein the stannate is sodium stannate at a concentration of 50 to 500 mg. per liter, the alkylidene diphosphonic acid is 1-hydroxyethylidene diphosphonic acid at a concentration of 100 to 1000 mg. per liter, and the hydrogen peroxide solution contains at least 50% $H_2O_2$ by weight and has a pH not more than about 1.5 pH units either above or below that pH representing the equivalence point of said hydrogen peroxide solution.

11. A composition according to claim 7 wherein the stannate is sodium stannate at a concentration of 50 to 500 mg. per liter, the alkylidene diphosphonic acid is 1-hydroxyethylidene diphosphonic acid at a concentration of 100 to 1000 mg. per liter, and the hydrogen peroxide solution contains about 70% $H_2O_2$ by weight and has a pH not more than 1.5 pH units either above or below that pH representing the equivalence point of said hydrogen peroxide solution.

References Cited

UNITED STATES PATENTS 2,904,517   9/1959   Baker _____ 23—207.5
3,234,140   2/1966   Irani _____ 252—99

EARL C. THOMAS, *Primary Examiner.*

MILTON WEISSMAN, *Examiner.*

H. S. MILLER, *Assistant Examiner.*